Oct. 23, 1934.  J. P. BREYNAERT  1,978,292
SPRING SHACKLE
Filed Nov. 4, 1933    2 Sheets-Sheet 1
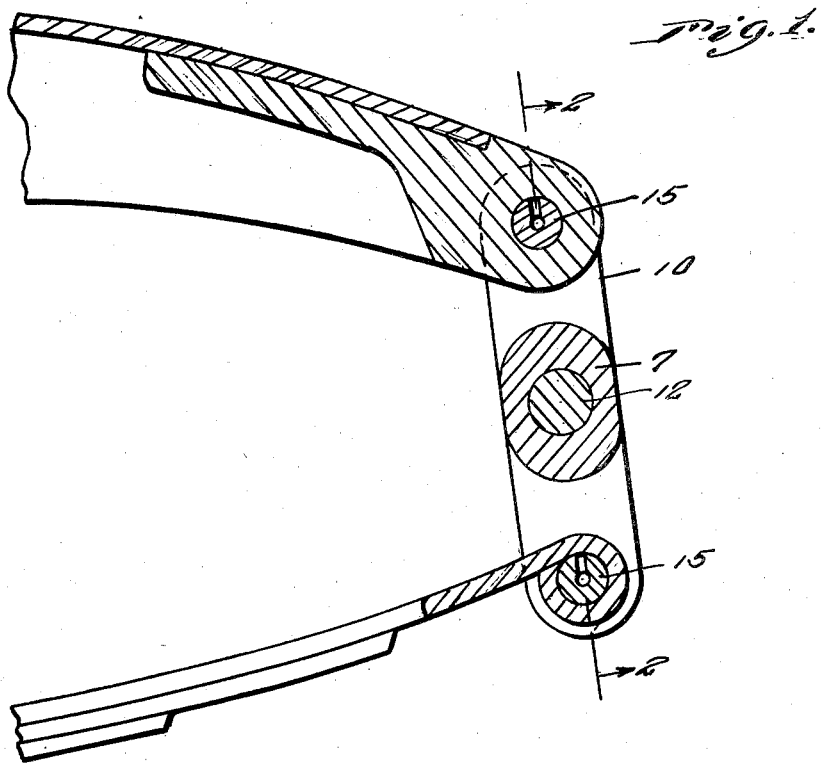
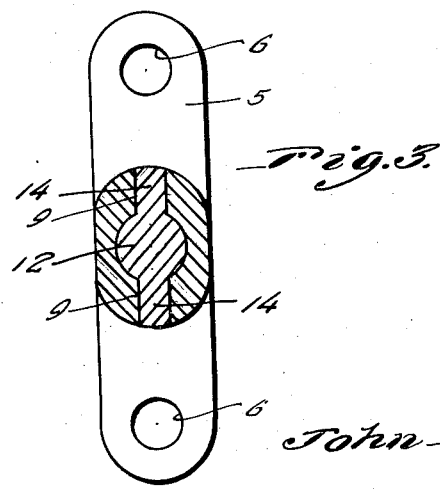
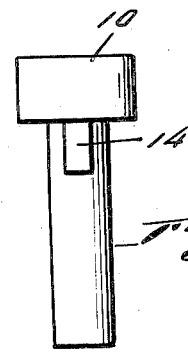
Inventor
John P. Breynaert
By Clarence A. O'Brien
Attorney Oct. 23, 1934.  J. P. BREYNAERT  1,978,292
SPRING SHACKLE
Filed Nov. 4, 1933   2 Sheets-Sheet 2

Inventor
John P. Breynaert
By Clarence A. O'Brien
Attorney

Patented Oct. 23, 1934

1,978,292

UNITED STATES PATENT OFFICE 1,978,292

SPRING SHACKLE

John P. Breynaert, Manchester, N. H.

Application November 4, 1933, Serial No. 696,701

1 Claim. (Cl. 267—54)

The present invention relates to a shackle for vehicle springs such as are used on automobiles and the like and has for its object to provide a structure which is simple, inexpensive to manufacture, easy to assemble and disassemble, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a vertical section through the shackle and the adjacent ends of the spring horn and the spring.

Figure 3 is a detail section through the shackle showing the lugs seated in the notches.

Figure 4 is a top plan view of one section of the shackle.

Figure 2:
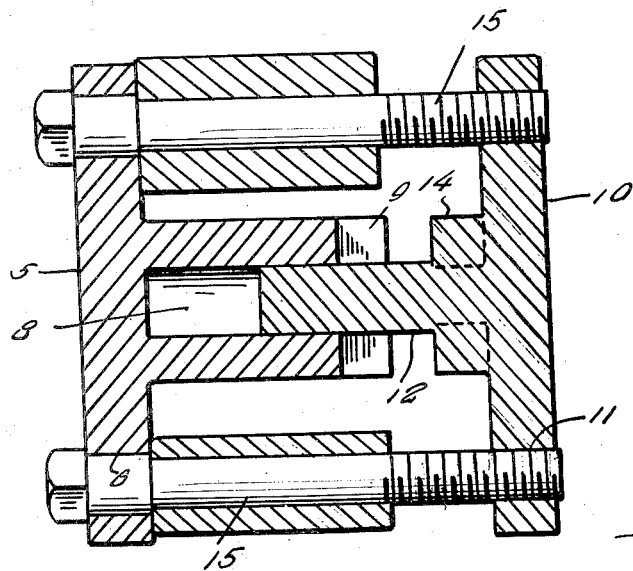
Figure 2 is a sectional view taken substantially on the line 2—2 of Figure 1 showing the shackle partially assembled.
Figure 5:
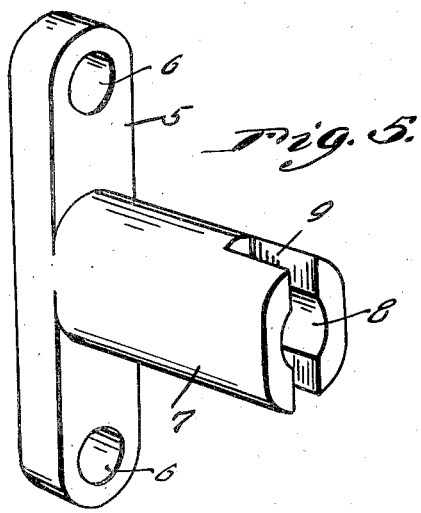
Figure 5 is a perspective view of the other section of the shackle.
Figure 6:
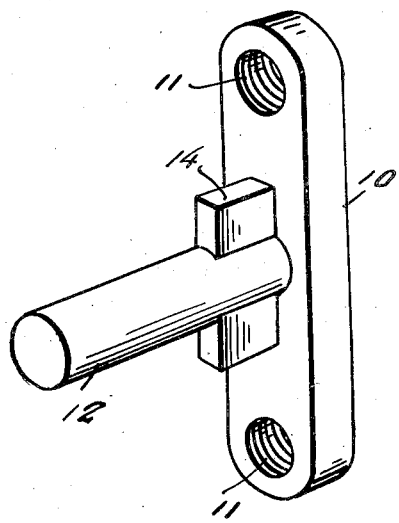
Figure 6 is a perspective view of said one section of the shackle.

Referring to the drawings in detail it will be seen that the shackle includes two sections. One section has an oblong body 5 with openings 6 in the ends thereof and from the center of the body projects perpendicularly a hollow stud 7 having the bore or interior 8 and provided with notches 9 at the end remote from the body 5 entering the interior or bore 8 from opposite sides.

The other section includes a body 10 similar to the body 5 and having openings 11 in the ends thereof but these openings 11 are threaded. A solid stud 12 projects from the center of the body 10 perpendicularly thereto to have a sliding fit in the bore 8 and on this stud 12 are a pair of lugs 14 oppositely disposed and formed integrally with the stud and the body 10 to slidably fit in the notches 9. Numerals 15 denote the shackle bolts which pass through the openings 6 and threadedly engage in the openings 11.

This shackle prevents side whip, noise and clatter. It also reduces wear on the spring ends and shackle ends and connections and will keep the springs in line and prevent spring leaves from sliding sideways. This shackle also tends to eliminate disalinement of the wheels and therefor prevents tires from wearing unevenly. The shackle tends to steady the car while in motion and reduce vibration in general. Adjustment may be made by filing off the necessary amount on the end of the stud 7 and the lugs 14.

It is thought that the construction, utility and advantages of this invention will now be clearly understood by those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A spring shackle of the class described comprising a pair of sections, one section including an oblong body having openings in the ends thereof and a hollow stud projecting from the center thereof and at the end remote from the body being provided with oppositely disposed notches entering the interior or bore of the stud, the other section including an oblong body having openings in the ends thereof and a stud projecting from the center thereof to slide into the interior of the first mentioned stud and provided with lugs on the stud adjacent its body to slide into said notches, said first mentioned section having its openings smooth, a pair of bolts for connecting opposite ends of the sections, the openings of the other section being threaded to receive the threaded portions of said bolt.

JOHN P. BREYNAERT.